United States Patent [19]

Ball et al.

[11] Patent Number: 4,482,519

[45] Date of Patent: Nov. 13, 1984

[54] SUBCOOLING MARGIN SYSTEM FOR COOLING FLUID IN A NUCLEAR REACTOR

[75] Inventors: Russell M. Ball; Edgar A. Womack, Jr., both of Lynchburg, Va.

[73] Assignee: The Babcock & Wilcox Company, New Orleans, La.

[21] Appl. No.: 256,331

[22] Filed: Apr. 22, 1981

[51] Int. Cl.³ .............................................. G21C 7/36
[52] U.S. Cl. ..................................... 376/216; 376/247
[58] Field of Search ........................ 376/216, 245, 247

[56] References Cited

U.S. PATENT DOCUMENTS 4,050,418  9/1977  Watanabe ........................... 376/247

Primary Examiner—Donald P. Walsh
Attorney, Agent, or Firm—Vytas R. Matas; Robert J. Edwards

[57] ABSTRACT

A monitoring system 10 for providing a display 38 of the margin between actual and saturation pressure as well as a display 68 between actual and saturation temperature for the cooling fluid of a nuclear reactor. The system 10 also has an alarm 46 which is set off whenever the pressure margin to saturation pressure reaches a predetermined limit as well as a temperature margin alarm 78 which sets off an alarm whenever the temperature margin to saturation temperature reaches a predetermined limit.

3 Claims, 2 Drawing Figures

SUBCOOLING MARGIN SYSTEM FOR COOLING FLUID IN A NUCLEAR REACTOR

TECHNICAL FIELD

This invention relates to nuclear reactor monitoring systems in general and in particular to such systems having computer memory type look-up tables correlating temperature and pressure relationships to provide a margin indicator between actual and saturation pressure and temperature points.

BACKGROUND ART

Control systems for nuclear reactors require the monitoring of temperature and pressure in the reactor core to determine the condition of the coolant flowing in the nuclear reactor. Depending upon the temperature and the pressure of the coolant, the coolant may exist either in a purely liquid form, purely vapor or steam form, or a combination of liquid and vapor of the liquid. Curves are known relating temperature and pressure of the coolant wherein the curve is called the saturation curve. An example of such a known curve may be seen in FIG. 1. The area above and to the left of the saturation curve is called the sub-cooled region. In this region of the curve, the cooling fluid exists purely in its liquid form. The area below and to the right of the saturation curve is called the superheat region and in this region the cooling fluid exists as a vapor or steam. Anywhere on the saturation curve, the cooling fluid may exist as a combination of liquid and its vapor.

Prior art indicating systems utilized the measurement of coolant temperature and pressure individually. It may be seen from the above description that knowledge of the coolant fluid state requires combining of pressure and temperature measurement to obtain an indication of the margin of subcooling. This can be done manually by the operator. However, it is desirable to have this important measure of system condition directly available from an instrument which accurately monitors the individual variable and represents the margin directly. Such an instrument would provide an indication to the reactor operator which would tell him the margin to the saturation curve taking into consideration both the actual measured temperature and the pressure of the cooling fluid.

SUMMARY OF THE INVENTION

The present invention solves the problems associated with the prior art systems as well as others by providing margin indicators to the control room operator indicating how far the coolant is from the saturation curve. This margin indication takes into consideration the actual measured temperature and pressure of the nuclear reactor core. To accomplish this, a first computer type look-up table is provided which receives data on the actual temperature of the coolant fluid and which outputs the functional saturation pressure for that temperature from the known saturation curves. This saturation pressure is next compared with an actual pressure measurement to provide the pressure margin readout indicator between actual pressure and saturation pressure. Similarly, a second computer type look-up table is provided which receives data on the actual reactor pressure and which produces a functional counterpart of the saturation temperature of the liquid for that pressure point. This saturation temperature is then compared with the actual cooling fluid temperature to provide a readout of the temperature margin to the saturation curve. The outputs of the pressure and temperature margin indicators may then be used with a particular adding circuit which adds or subtracts the margin within which the control operator wishes to operate to set off an alarm whenever either the pressure or the temperature exceeds the safety margin provided by the adder.

In view of the foregoing, it will be seen that one aspect of the present invention is to provide a margin indicator for both the coolant temperature and pressure indicative of how far away the parameters are from the saturation point.

Another aspect of the present invention is to provide an alarm whenever either the temperature or the pressure parameters are closer to the saturation point than normal operation allows.

These and other aspects of the present invention will be more clearly understood after a review of the following description of the preferred embodiment when considered with the accompanying drawings.

DESCRIPTION OF THE PREFERRED EMBODIMENT

Figure 2:
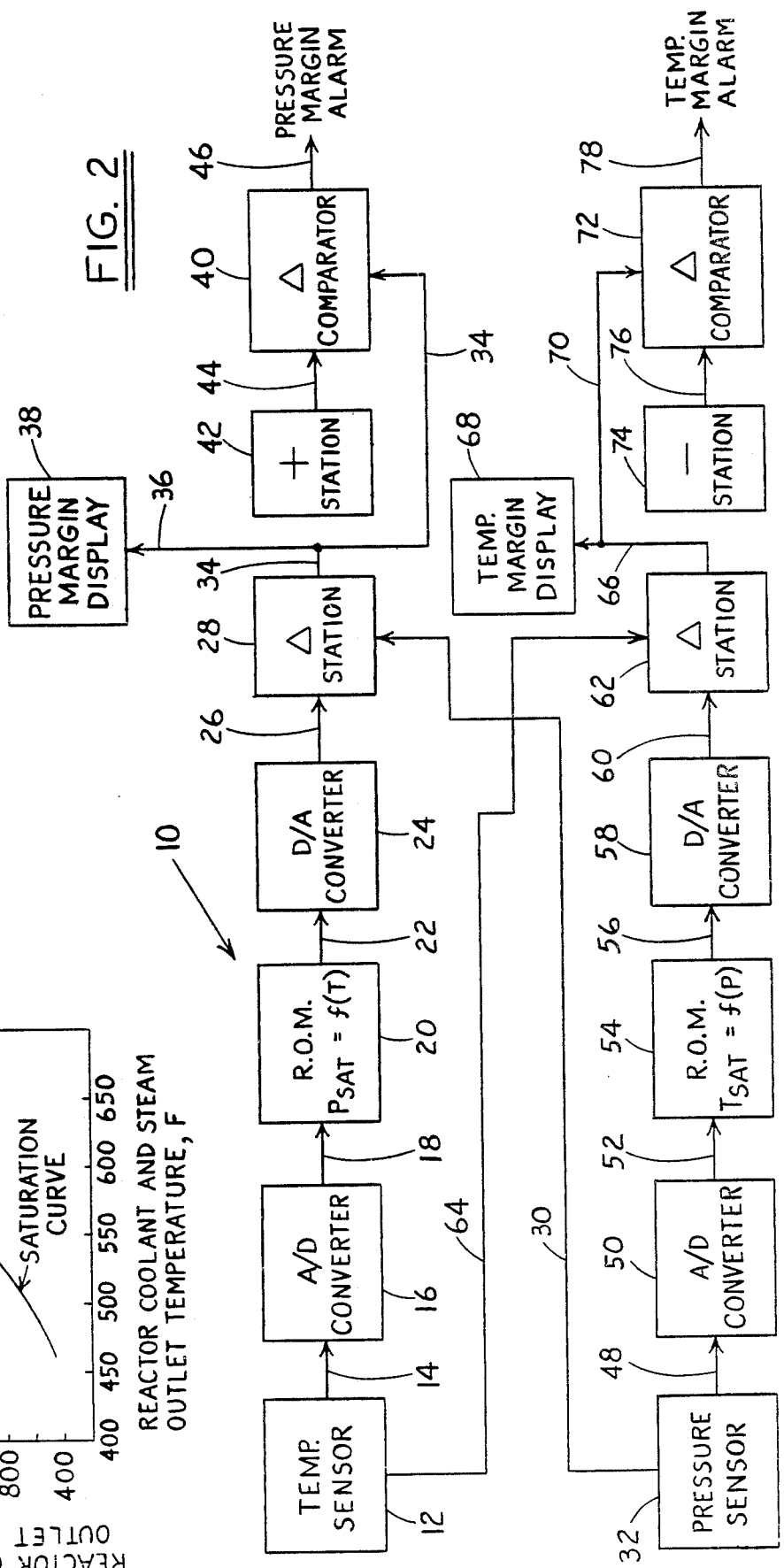
FIG. 2 is a schematic representation of the safety margin indicator system of the present invention.

Referring now to the drawings wherein the showings are for purposes of detailing a preferred embodiment of the present invention and are not intended to restrict the invention thereto, FIG. 2 shows a safety margin display and alarm system 10 which is intended to be connected to a nuclear power plant's temperature and pressure instrumentation and which will display the margin to saturation temperature ($T_{sat}$) and the margin to saturation pressure ($P_{sat}$). The system 10 provides an on-line aid to the power plant operator of a pressurized water nuclear power plant to help him assure that an adequate saturation margin is maintained in the nuclear power plant at all times.

The system 10 is designed to be located in the power plant where the required connections to plant temperature and pressure can be most easily made. The remote pressure margin and temperature margin displays as well as the alarms are located in the control room of the power plant which control room can be located up to 500 feet from the rest of the power plant instrumentation and its connections.

Figure 1:
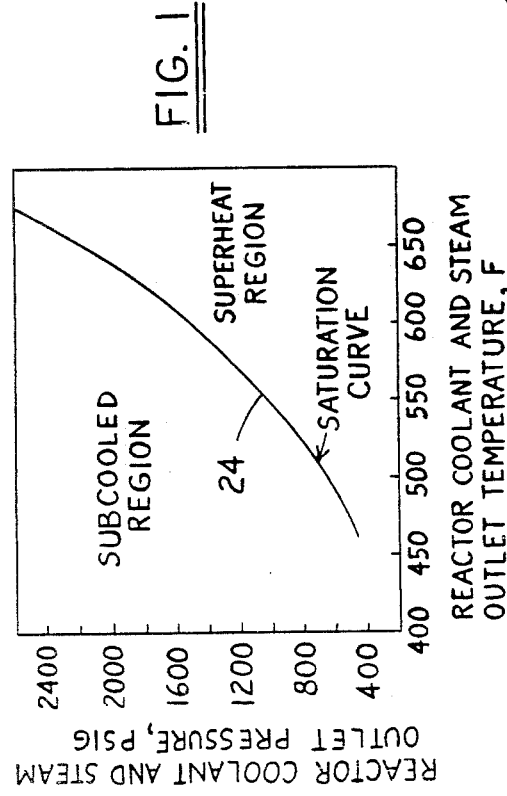
FIG. 1 is a schematic representation of a saturation curve for reactor coolant pressure and temperature.

The system 10 has a temperature sensor 12 which is connected to a temperature measuring device located in the hottest part of the reactor to sense the hottest condition of the reactor coolant. Usually, this is near the top of the reactor core. The temperature sensor may also include some sort of selective circuit wherein the hottest measured temperature is selected in situations where a plurality of temperature measuring points are sensed. In any event, the temperature sensor 12 is an analog temperature measurement which is transmitted along line 14 to an analog-to-digital converter 16 which converts the analog temperature signal into a digital signal. The output of the analog-to-digital converter 16 is a 12-bit digital code which varies linearly over the range of the input signal. Since the output of the analog-to-digital converter 16 is a binary code that is proportional to the voltage presented to it, this code has no numerical meaning with regard to the actual temperatures that it represents. Therefore, the code on the output lead 18 of the analog-to-digital converter 16 must be converted to the binary value of the incoming plant signals. This is accomplished in a read-only memory 20 which is programmed to accept the inputs from the analog-to-digital converter on specific address leads and to output the appropriate binary value of the corresponding pressure from the saturation curve of FIG. 1 relating to the temperature sensed by the sensor 12. Thus, for any specific temperature sensed, the read-only memory 20 outputs along line 22 the corresponding pressure from the saturation curve 24 detailed in FIG. 1. This saturation pressure signal is forwarded to a digital-to-analog converter 24 which converts the digital saturation pressure signal to its analog counterpart and transmits it along line 26 to a difference station 28. The difference station 28 compares this saturation pressure signal with an actual reactor coolant pressure signal transmitted along line 30 to the difference station 28 from a pressure sensor 32. The pressure sensor 32 is connected to an analog pressure sensing device which is located in the nuclear reactor to measure the lowest coolant pressure in the coolant circulating system. This measurement is usually just before the entrance to the recirculating pump which recirculates the coolant fluid in the reactor. Thus the difference station 28 subtracts the actual coolant fluid pressure from the pressure required for saturation and outputs this signal along line 34. Line 36 is connected to line 34 to forward this pressure margin signal to a pressure margin display meter 38 which is remotely located in the control room for the nuclear reactor. Thus, the control room operator has a visual display indicating the pressure margin to saturation of the fluid and can thus determine the condition of the cooling fluid. The pressure margin signal is also transmitted along line 34 to a comparator 40 which compares the pressure margin signal with a predetermined pressure margin transmitted from an adding station 42 along line 44 to the comparator 40. The usual pressure margin signal is maintained around 200 psi and the comparator 40 is set to establish a control signal along line 46 to a control room alarm, either visual or audible, whenever the pressure margin along line 34 is compared to be less than the 200 psi margin established by adding station 42.

Similarly, a temperature to saturation margin and temperature margin alarm is provided. To accomplish this, the pressure sensor 32, which is an analog signal transmitted along line 48 is converted to a digital 12-bit counterpart by an analog-to-digital converter 50. The digital pressure signal is sent along line 52 to a read-only memory unit 54 which is programmed to send out a temperature saturation point from the saturation curve 24 of FIG. 1 for the actual measured pressure signal. This temperature saturation signal is sent along line 56 to a digital-to-analog converter 58 which converts the digital temperature saturation signal to an analog output along line 60 which is connected to a difference station 62. The difference station 62 compares the temperature saturation signal from line 60 with the actual temperature signal sensed by temperature sensor 12 and sent to difference station 62 along line 64. The output of the difference station 62 is sent along line 66 to a temperature margin display unit 68 which is also remotely located in the control room for the nuclear reactor. Thus, the control room operator has both a pressure margin and temperature margin display unit which tells him the degree to which the coolant pressure and temperature is within the saturation curve 24 of FIG. 1. The temperature margin signal is also sent along line 70 to a comparator 72 which compares the actual temperature margin of the reactor coolant with a predetermined temperature margin established by a subtracting circuit 74 whose signal is sent to the comparator 72 along line 76. The usual temperature margin maintained is a minus 10° F. to saturation temperature. Thus, the comparator 72 establishes a control signal along line 78 whenever the actual temperature margin reaches a difference of minus 10° F. from the saturation temperature. The control signal along line 78 is sent to either an audible or a visual alarm located in the control room.

In view of the foregoing it will be seen that the Applicants' present invention provides both a visual display of actual pressure and temperature margin to saturation as well as provides an alarm whenever the pressure margin and temperature margin signals reach within predetermined limits.

Certain modifications and improvements will become obvious to those skilled in the art upon reading the Specification. By way of example, the entire system could be made entirely digital instead of analog. It will be understood that all such improvements and modifications have been deleted herein for the sake of conciseness and readability but are properly within the scope of the following claims.

1. A system for indicating the pressure and temperature margins within which a nuclear reactor is operating in the subcooled region of a saturation curve comprising:

first transducer means for measuring the highest temperature of the cooling fluid in a nuclear reactor;

second transducer means for measuring the lowest pressure of the cooling fluid in a nuclear reactor;

a first ROM station connected to said first transducer means containing a precalculated function of the saturation pressures corresponding to the temperatures measured by said first transducer means;

a second ROM station connected to said second transducer means containing precalculated saturation temperatures for the various pressure measurements made by said second transducer means;

a first comparing station means connected to said first ROM station and to said second transducer means for comparing the actual pressure sensed by said first transducer means with the saturation pressure corresponding to the temperature measurement made by said first transducer means and establish a signal indicative of the pressure margin to saturation; and second comparing station means connected to said first transducer means and to said second ROM station for comparing the actual temperature measurement of said first transducer means with the saturation temperature corresponding to the pressure measurement made by said second transducer means to establish a signal indicative of the temperature margin to saturation.

2. A monitoring system as set forth in claim 1 wherein each of the read-only memory station has a digital parameter value stored therein indicative of the analog value of the parameter and a corresponding precalculated functional value for each store parameter value representative of the saturation point of the other parameter.

3. A monitoring system as set forth in claim 2 further including individual display units connected to each of said comparing stations for indicating the difference between actual value and saturation value of each parameter.

* * * * *